No. 763,547. PATENTED JUNE 28, 1904.
G. B. DUSINBERRE.
ALTERNATING CURRENT INDUCTION MOTOR.
APPLICATION FILED FEB. 27, 1904.

NO MODEL.

WITNESSES:
C. L. Belcher
Fred. H. Miller

INVENTOR
George B. Dusinberre
BY Wesley G. Carr
ATTORNEY.

No. 763,547.

Patented June 28, 1904.

UNITED STATES PATENT OFFICE.

GEORGE B. DUSINBERRE, OF EDGEWOOD PARK, PENNSYLVANIA, ASSIGNOR TO WESTINGHOUSE ELECTRIC & MANUFACTURING COMPANY, A CORPORATION OF PENNSYLVANIA.

ALTERNATING-CURRENT INDUCTION-MOTOR.

SPECIFICATION forming part of Letters Patent No. 763,547, dated June 28, 1904.

Application filed February 27, 1904. Serial No. 195,681. (No model.)

*To all whom it may concern:*

Be it known that I, GEORGE B. DUSINBERRE, a citizen of the United States, and a resident of Edgewood Park, in the county of Allegheny and State of Pennsylvania, have invented a new and useful Improvement in Alternating-Current Induction-Motors, of which the following is a specification.

My invention relates to polyphase electric motors of the induction type; and it has for its object to provide simple and contact starting-resistances for the circuits of the secondary members of such motors and inexpensive and efficient mechanism for automatically cutting such resistances out of circuit as the speed increases.

It has heretofore been the practice in many cases to include more or less external resistances in the circuits of the secondary members of induction-motors in order to keep down excessive currents in starting and to cut out such resistances when the motors have reached normal operating speeds.

In the case of motors having stationary secondary members the introduction and cutting out of such resistances is a comparatively simple matter; but where the secondary members rotate the introduction and cutting out of the starting-resistances is accomplished with less facility.

My present invention is specially designed to both simplify and cheapen the construction of the resistance employed and also to so locate and arrange the resistance and the means for varying its active length that they may be readily accessible and free from danger of interfering in any way with the operation of the main parts of the motor and be automatically operated by centrifugal force to cut the resistance out of circuit as the speed of the motor increases.

Figure 1:
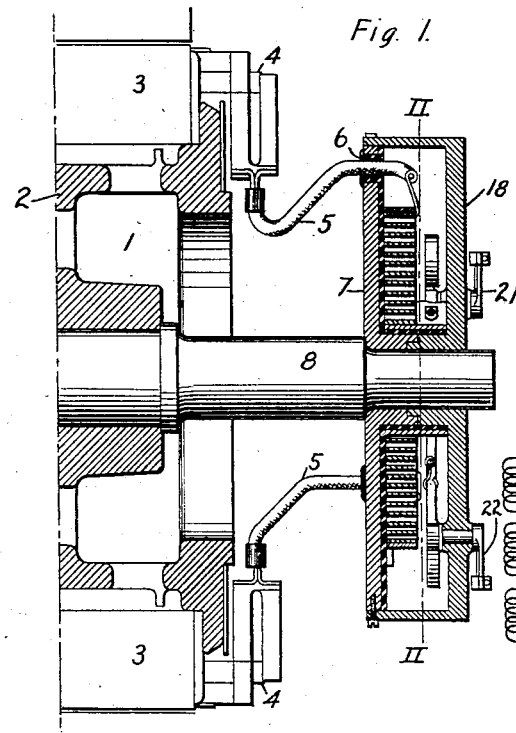
Figure 4:
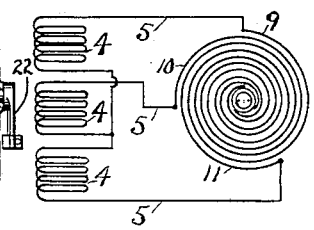
Figure 2:
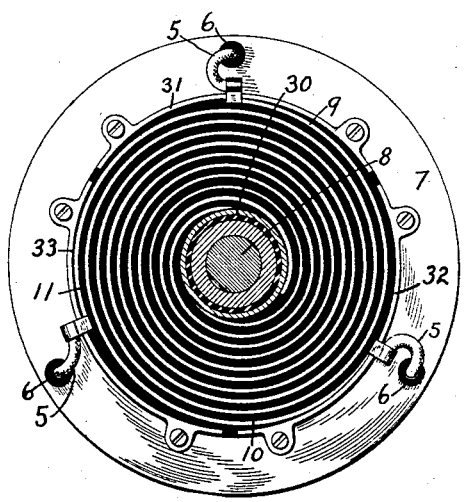
Figure 3:
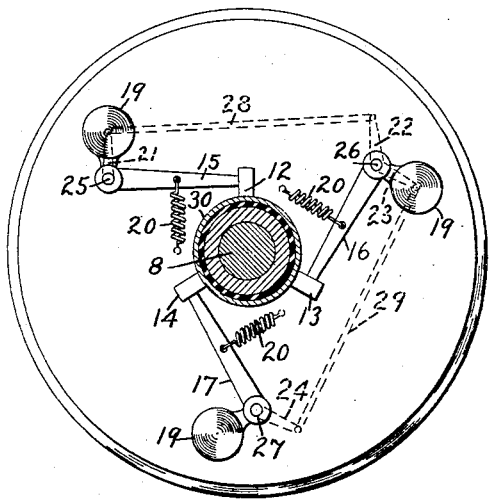

Figure 1 of the accompanying drawings is a longitudinal section of a portion of an induction-motor and my invention applied thereto. Fig. 2 is a transverse section on line II II of Fig. 1. Fig. 3 is an end elevation of the movable contact devices, their speed-governor-operating means, and the supporting-disk therefor. Fig. 4 is a diagram of the secondary circuits of the motor and the external resistance.

The secondary member 1 of the motor comprises a suitable spider 2, a laminated slotted core 3, and a winding 4, the coils of which are provided at suitable intervals with leads 5, which extend outward and project through holes 6 in a disk 7, which is rigidly mounted upon the motor-shaft 8.

In the motor here indicated three leads 5, corresponding to three phases of current, are employed. These are respectively connected to the outer ends of three spiral interleaved resistance-coils 9, 10, and 11, which are suitably insulated from each other and are securely attached to and insulated from the disk 7. These coils 9, 10, and 11, as here shown, are of strap form, having bare outer edges, with which engage three brushes 12, 13, and 14. These brushes are respectively mounted upon the inner ends of arms 15, 16, and 17, the outer ends of said arms being pivotally supported upon a disk 18 and severally provided with weights 19, which are thrown outward by centrifugal force against the action of springs 20, the weights and springs being so proportioned as to effect movement of the brushes at the rate desired in order to gradually cut the resistance out of circuit.

The brushes are held in engagement with the edges of the resistance-coils by means of the disk 18 and are compelled to move in unison by means of arms 21, 22, 23, and 24, which project from short shafts or pivots 25, 26, and 27, on which the arms 15, 16, and 17 are mounted, and are connected by means of rods 28 and 29, located at the outer side of the disk 18.

The inner ends of the coils 9, 10, and 11 are all connected to a ring 30, with which the brushes engage when the motor is at rest, and the outer ends of the coils are respectively connected to three ring-segments 31, 32, and 33, with which the brushes make engagement when the motor has attained such speed as to effect the cutting out from the circuit of all the resistance.

The details of construction as regards the means for cutting the resistance into and out of circuit may of course be varied from what is shown within the scope of my invention. I desire it to be therefore understood that the claims are not to be limited either to the specific automatic means shown and described or to automatic means of any type or kind, except in so far as limitations are expressly set forth.

I claim as my invention—

1. In an induction-motor, the combination with the rotatable secondary member, of spiral resistance-coils having exposed edge surfaces and mounted to rotate with said secondary member and a contact device so constructed and disposed as to be movable by centrifugal force to gradually cut said resistance-coils out of circuit as the motor speeds up.

2. In an induction-motor, the combination with the rotatable secondary member and resistance-coils having exposed surfaces and mounted to rotate with said secondary member, of a contact device so constructed and arranged as to be movable by centrifugal force to gradually cut said resistance-coils out of circuit as the motor speeds up.

3. In an induction-motor, the combination with the rotatable secondary member and three interleaved, spiral, resistance-coils mounted to rotate with said secondary member and having exposed edges, of a contact device arranged to span said three coils and movable to progressively cut them out of circuit.

4. In an induction-motor, the combination with the rotatable secondary member of the motor and a plurality of spiral, interleaved, resistance-coils connected to the winding of said secondary member and mounted to rotate therewith, of a contact device arranged to make contact with corresponding exposed edges of said resistance-coils and movable across the same to gradually cut the resistance out of circuit.

In testimony whereof I have hereunto subscribed my name this 16th day of February, 1904.

GEORGE B. DUSINBERRE.

Witnesses:
 WESLEY G. CARR,
 BIRNEY HINES.